United States Patent [19]

Clarke

[11] Patent Number: 4,566,842

[45] Date of Patent: Jan. 28, 1986

[54] WHEELCHAIR DOCKAGE AND STORAGE SYSTEM

[75] Inventor: Robert A. Clarke, Madison Heights, Mich.

[73] Assignee: Autodynamics Corporation of America, Madison Heights, Mich.

[21] Appl. No.: 605,302

[22] Filed: Apr. 30, 1984

[51] Int. Cl.[4] .............................................. B60R 11/00

[52] U.S. Cl. ..................................... 414/462; 414/541

[58] Field of Search ............... 414/462, 540, 541, 545, 414/921; 224/42.43, 42.42, 42.45 R, 310, 311, 321

[56] References Cited

U.S. PATENT DOCUMENTS

| | | | |
|---|---|---|---|
| 2,148,932 | 2/1939 | Fisher | 414/541 |
| 4,133,437 | 1/1979 | Gates | 414/921 X |
| 4,142,641 | 3/1979 | Dake | 414/921 X |
| 4,236,860 | 12/1980 | Gottlieb et al. | 414/462 |
| 4,365,924 | 12/1982 | Brigman et al. | 414/921 X |
| 4,474,527 | 10/1984 | Risner et al. | 414/921 X |

*Primary Examiner*—Joseph E. Valenza
*Assistant Examiner*—Janice Krizek
*Attorney, Agent, or Firm*—Gerald E. McGlynn, Jr.

[57] ABSTRACT

A wheelchair docking and storage assembly for collapsing and storing a wheelchair having a frame which folds as the frame is raised relative to the wheels thereof including a lifting mechanism including an arm for engaging the wheelchair and a raising mechanism for selectively and reversibly raising the wheelchair. A stop mechanism engages the wheel of the wheelchair whereby the arm raises the frame of the wheelchair relative to the wheel thereof which engages the stop mechanism thereby collapsing the wheelchair automatically.

20 Claims, 16 Drawing Figures

WHEELCHAIR DOCKAGE AND STORAGE SYSTEM

BACKGROUND OF THE INVENTION (1) Field of the Invention

The instant invention relates to a lifting and folding mechanism for wheelchairs. More specifically, the instant invention relates to means for mechanically lifting and folding a wheelchair having a frame which folds as the frame is raised relative to the wheels thereof whereby the wheelchair is raised and folded against the inside of an vehicle door.

(2) Description of the Prior Art

Various prior art patents teach assemblies for lifting a wheelchair and disposing the wheelchair within a compartment of a vehicle such as a van. Examples of such prior art patents are U.S. Pat. Nos. 4,096,955 to Dake, issued June 27, 1978 and 4,133,437 to Gates, issued Jan. 9, 1979. The Gates patent utilizes a screw and follower mechanism for raising a platform upon which the wheelchair is disposed. These prior art assemblies necessarily require a large compartment within the vehicle for storing the unfolded wheelchair. The prior art patents provide no means for automatically folding the wheelchair. Additionally, it is quite awkward for the person using the wheelchair to travel to and from the wheelchair once it is stored. The instant invention solves the aforementioned problems by providing an assembly which automatically lifts and folds the wheelchair, the assembly being well adapted to be mounted on the inside of a door of an vehicle thereby providing convenient storage that can be adapted not only to vehicles such as vans, but also to automobiles and the like.

SUMMARY OF THE INVENTION

According to the present invention there is provided a wheelchair docking and storage assembly for collapsing and storing a wheelchair having a frame which folds as the frame is raised relative to the wheels thereof, the assembly including lifting means for engaging the frame of the wheelchair and lifting the wheelchair and stop means for engaging a wheel of the wheelchair whereby the lifting means raises the wheelchair relative to the wheel thereof which engages the stop means to collapse the wheelchair.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
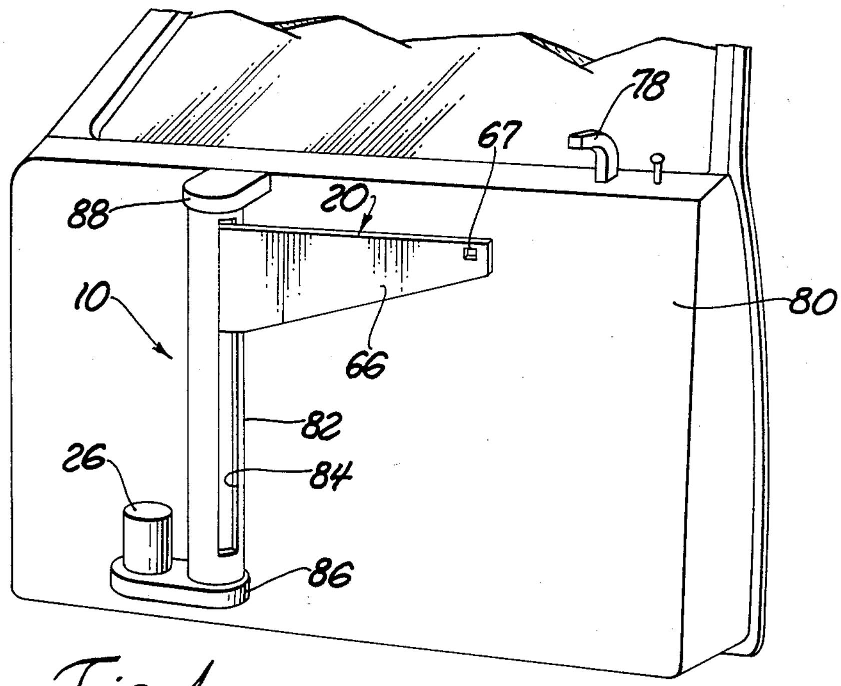
FIG. 1 is an elevational perspective view of the subject invention mounted on the inside of an automobile door.

A wheelchair docking and storage assembly for collapsing and storing a wheelchair is generally shown at 10 in FIGS. 1 through 12. The assembly 10 is adapted for collapsing and storing a wheelchair generally shown at 12 in FIGS. 2 and 6 through 12. The wheelchair 12 has a frame including a pair of arms 14 and collapsible cross frame 16 which folds as the frame 16 is raised relative to the wheels 18 thereof. The instant invention may be adapted to any wheelchair wherein the wheelchair includes a frame which collapses as the frame is raised relative to the wheels thereof.

The assembly 10 includes lifting means for engaging and lifting the frame, and more specifically, the arm 14 of the wheelchair 12, and stop means for engaging a wheel 18 of the wheelchair 12 whereby the lifting means raises the wheelchair 12 relative to the wheel 18 thereof which engages the stop means to collapse the wheelchair 12.

Figure 4:
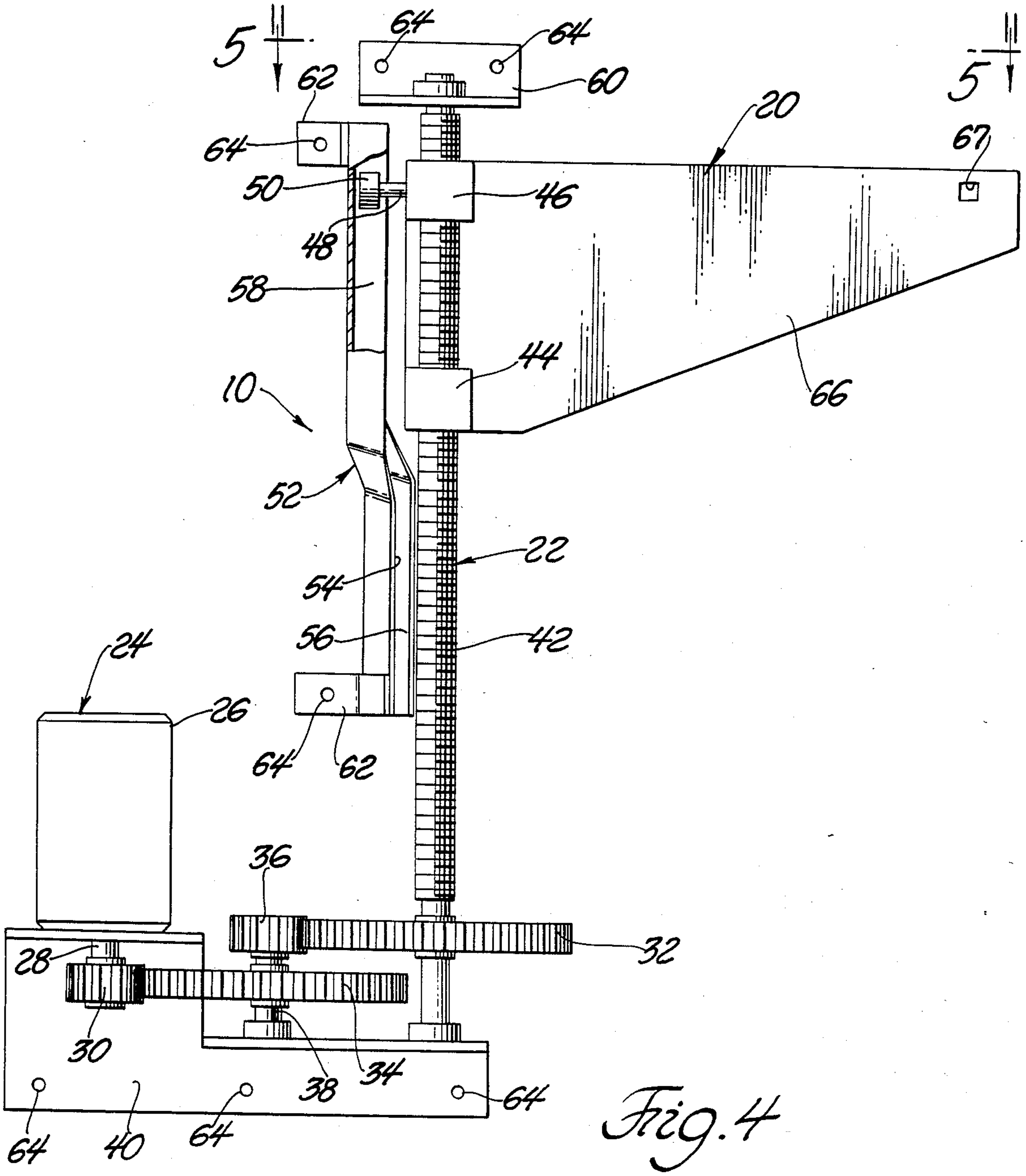
FIG. 4 is an elevational view partially broken away of the instant invention wherein the housing has been removed.
Figure 5:
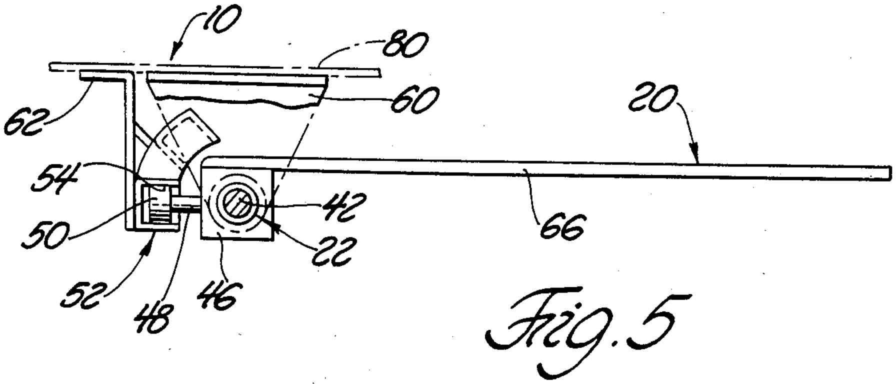
FIG. 5 is a top plan view partially broken away taken substantially along the lines of 5—5 of FIG. 4.

A first embodiment of the lifting means is shown in FIGS. 4 and 5. The lifting means includes arm means generally indicated at 20 for engaging the wheelchair, raising means generally indicated at 22 for selectively and reversibly raising the arm means 20, and drive means generally indicated at 24 operatively connected to the raising means 22 for driving the raising means 22.

The drive means 24 includes a motor 26 having a drive shaft 28 extending therefrom and a drive gear 30 mounted on the drive shaft 28. A driven gear 32 is operatively connected to the drive gear 30 by intermediate gears 34 and 36. Gears 34 and 36 are mounted on shaft 38. The entire drive means 24 is supported on the inside of a vehicle door by mounting bracket 40.

The raising means 22 includes a screw member 42 having an outer threaded surface operatively connected to the drive means 24 by the gears 32, 34 and 36. The motor 26 can be selectively controlled to drive the screw member 42 in a clockwise or counterclockwise direction. The raising means further includes follower means comprising two follower members 44 and 46 which are fixedly connected to the arm means 20 and threadedly connected to the screw member 42 so as to travel along the screw member 42 as it is driven by the drive means 24.

The raising means 22 further includes guide means for guiding the follower members 44 and 46 to turn relative to the screw member 42 and move the arm means 20 against the supporting wall of the vehicle door as the follower members 44 and 46 are raised along the screw member 42 and to move the arm means 20 away from the support wall or inner wall of the vehicle door as the follower members 44 and 46 are lowered along the screw member 42. More particularily, each of the follower members 44 and 46 have a threaded bore therethrough threadedly engaging the screw member 42. At least one of the follower members 46 has an axle member 48 extending therefrom and a cam wheel 50 rotatably mounted on the axle member 48. The guide means comprises a guide track generally indicated at 52 which is substantially U-shaped in cross-section defining an inner channel 54. The cam wheel 50 is rotatably mounted within the channel 54 for movement therealong. The channel 54 includes a lower portion 56 and an upper portion 58 which is twisted approximately 25 degrees clockwise relative to the lower portion 56. The channel 54 has a constant cross-sectional dimension whereby the arm means 20 is pivoted about 25 degrees as the follower members 44 and 46 travel from the lower portion 56 of the channel 54 to the upper portion 58 thereof. In other words, when the arm means 20 is disposed at the lower portion of the screw member 42, the follower member 50 is within the lower portion 56 of the channel 54. In this position, the arm means 20 extends away from the support wall which would be the inside of a vehicle door. As the screw member 42 is actuated to rotate by the drive means 24, the arm means 20 is raised along the screw 42 by the travel of the follower members 44 and 46 along the threaded portion of the screw member 42. As the arm means 20 and follower members 44 and 46 are raised along the screw member 42, the cam wheel 50 travels through the channel 54 from the lower portion 56 to the upper portion 58 thereof. As the cam member 50 travels into the upper portion 58 of the channel 54, the arm means 20 is turned about the screw member 42 so as to be disposed against the support wall or inside wall of a vehicle door. The motor 26 may be controlled to reverse the drive of the screw member 42 so as to lower the arm means 20 in a similar fashion and extend it from the support wall as it enters the lower portion 56 of the channel 54.

The screw member 42 is supported for rotation between an upper bracket 60 and the lower bracket 40. The channel member 52 is supported by brackets 62, brackets 62 being connected to the channel as by welding. Each bracket 40, 60 and 62 includes openings 64 therethrough adapted to receive screw members or the like for securing the brackets 40, 60 and 62 to a support wall such as to the inside of a vehicle door.

Figure 2:
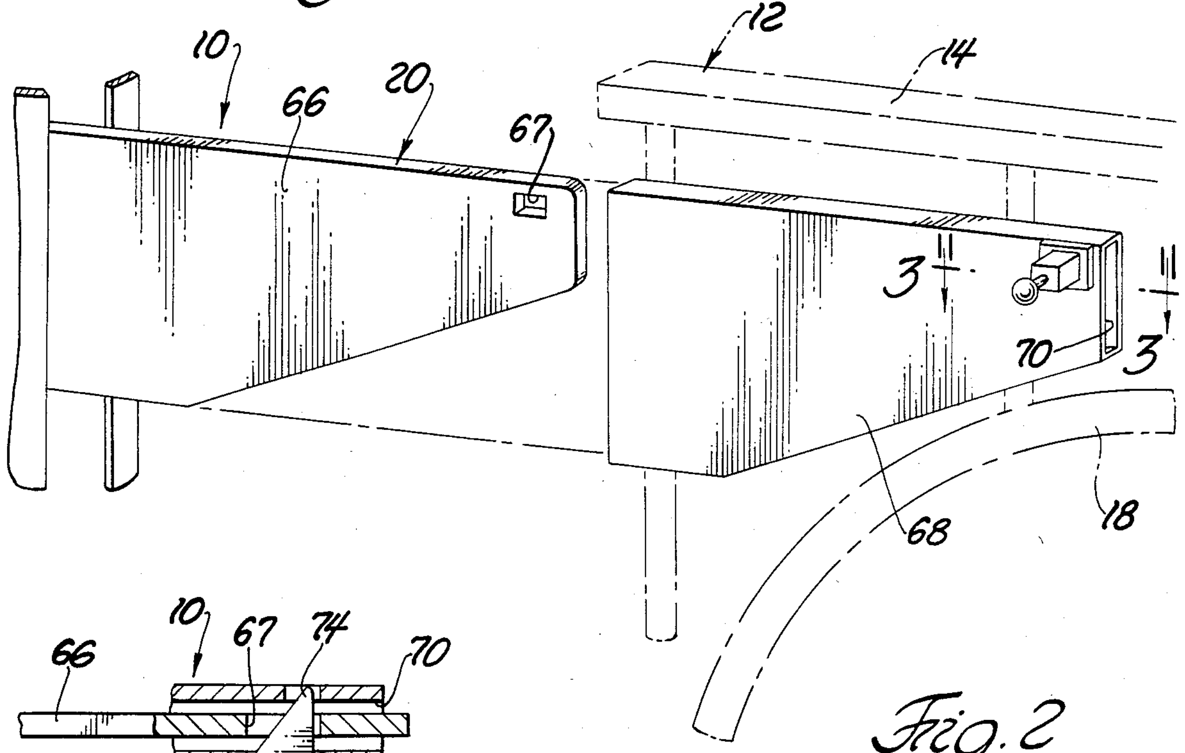
FIG. 2 is an enlarged perspective view of the subject invention and the envelope member thereof mounted on the arm of a wheelchair.

The arm means 20 includes an arm member 66 which is connected to the follower members 44 and 46. The arm member 66 includes an opening 67 at the distal end thereof. The arm means 20 further includes an envelope member 68 adapted to be connected to the arm 14 of the wheelchair 12 as shown in FIG. 2. In the preferred embodiment, the arm member 66 has a flat upper edge and a bottom edge which tapers upwardly as it extends distally from the follower members 44, 46. The envelope member 68 has a complimentary shape for receiving the arm member 66. The envelope member has an inner pocket 70, having a complimentary shape for receiving the arm member 66.

Figure 3:
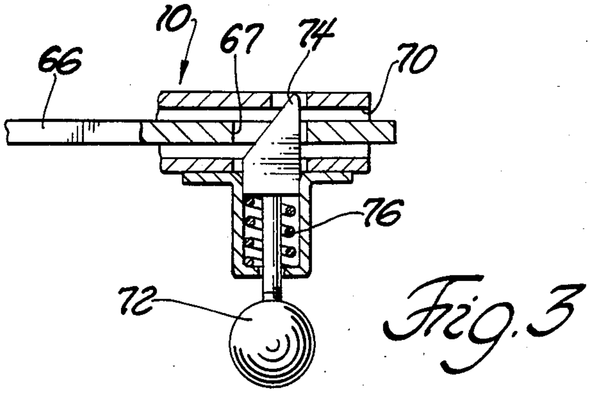
FIG. 3 is a cross-sectional view taken substantially along lines 3—3 of FIG. 2.

The envelope member 68 further includes locking means for locking the arm member 66 within the pocket 70. The locking means includes a plunger member 72 having a tapered end portion 74, as shown in FIG. 3. A spring 76 inwardly biases the plunger member 72 into the pocket 70 for inserting the tapered end portions 74 of the plunger member 72 into the hole 67 in the plate member 66. Thusly, the plate member 66 may be reversibly locked within the pocket 70 of the envelope member 68.

The stop means of the instant invention includes an L-shaped bracket 78 having a first end adapted to be secured to a vehicle door 80 as shown in FIGS. 1, and 6 through 12 and a second end having a lower surface for engaging the raised wheel 18 of the wheelchair 12 as the lifting means 22 of the instant invention continues to raise the frame 16 of the wheelchair 12.

As shown in FIG. 1, the instant invention includes housing means for enclosing the lifting means 22 of the instant invention. The housing means comprises a cylindrical member 82 disposed about the screw member 42 and the guide means 52. The cylindrical member 82 has a vertical slot 84 extending therethrough along the length thereof. The arm member 66 extends through the slot 80. The housing means further includes a pair of spaced support brackets 86 and 88 for supporting the cylindrical member 82 therebetween. The cylindrical member 82 is rotatably mounted between the support brackets 86 and 88 allowing rotation of the cylindrical member 82 as the arm member 66 pivots about the screw member 42. Alternatively, the cylindrical member 82 may include a slot wide enough to allow the pivoting movement of the arm member 66 therein thereby not necessitating rotation of the cylindrical member 82.

Figure 13:
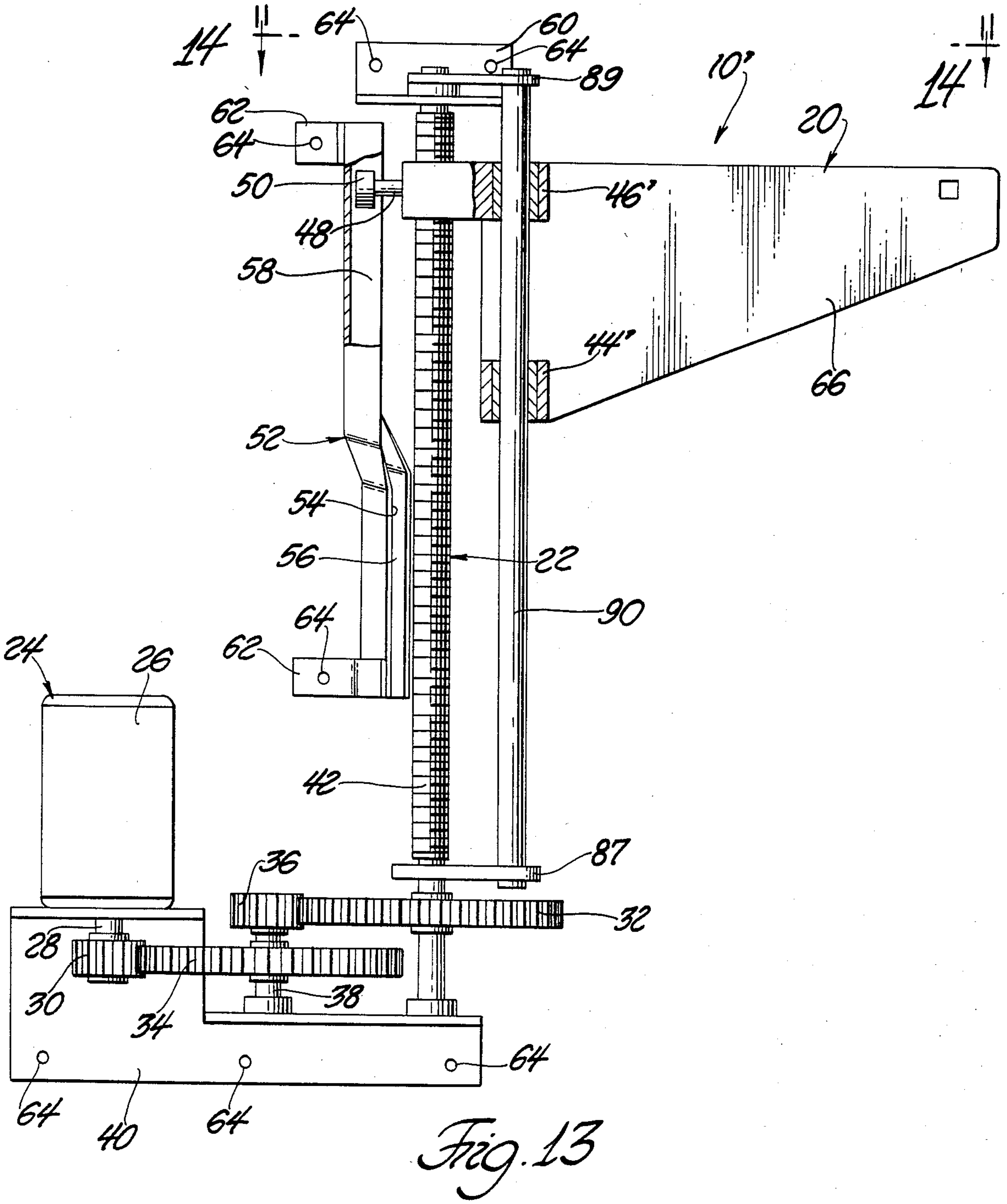
FIG. 13 is an elevational view partially broken away of a second embodiment of the instant invention.
Figure 14:
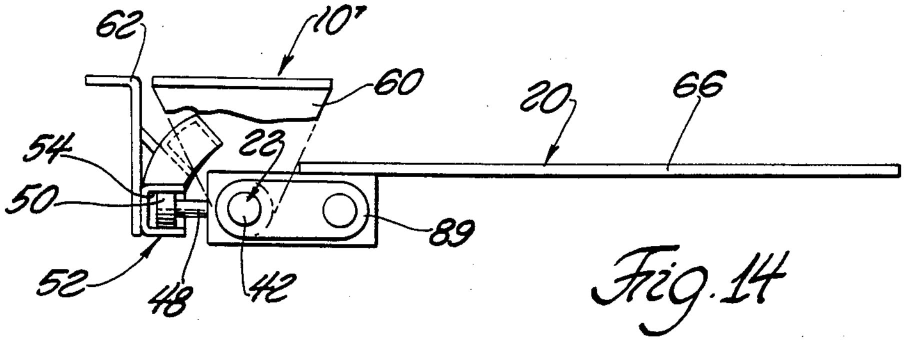
FIG. 14 is a top plan view partially broken away taken substantially along lines 14—14 of FIG. 13.

A second embodiment of the instant invention is generally shown at 10′ in FIGS. 13 and 14. Like numerals are used to represent similar structure between the several embodiments. The second embodiment of 10′ of the instant invention includes side load absorbing means for absorbing side loads, placed upon the arm member 66. In other words, means are provided for absorbing the side loads placed on the arm member 66 by the raising and folding of the wheelchair 12. The assembly 10′ includes spaced support brackets 87 and 89 mounted at the ends of the screw member 42. The side load absorbing means includes a rod member 90 supported between the support brackets 87 and 89 and spaced and parallel relative to the screw member 42. A pair of follower members 44′ and 46′ slidingly engage the rod member 90. Thusly, the rod member 90 absorbs side loads placed on the arm member 66.

Figure 15:
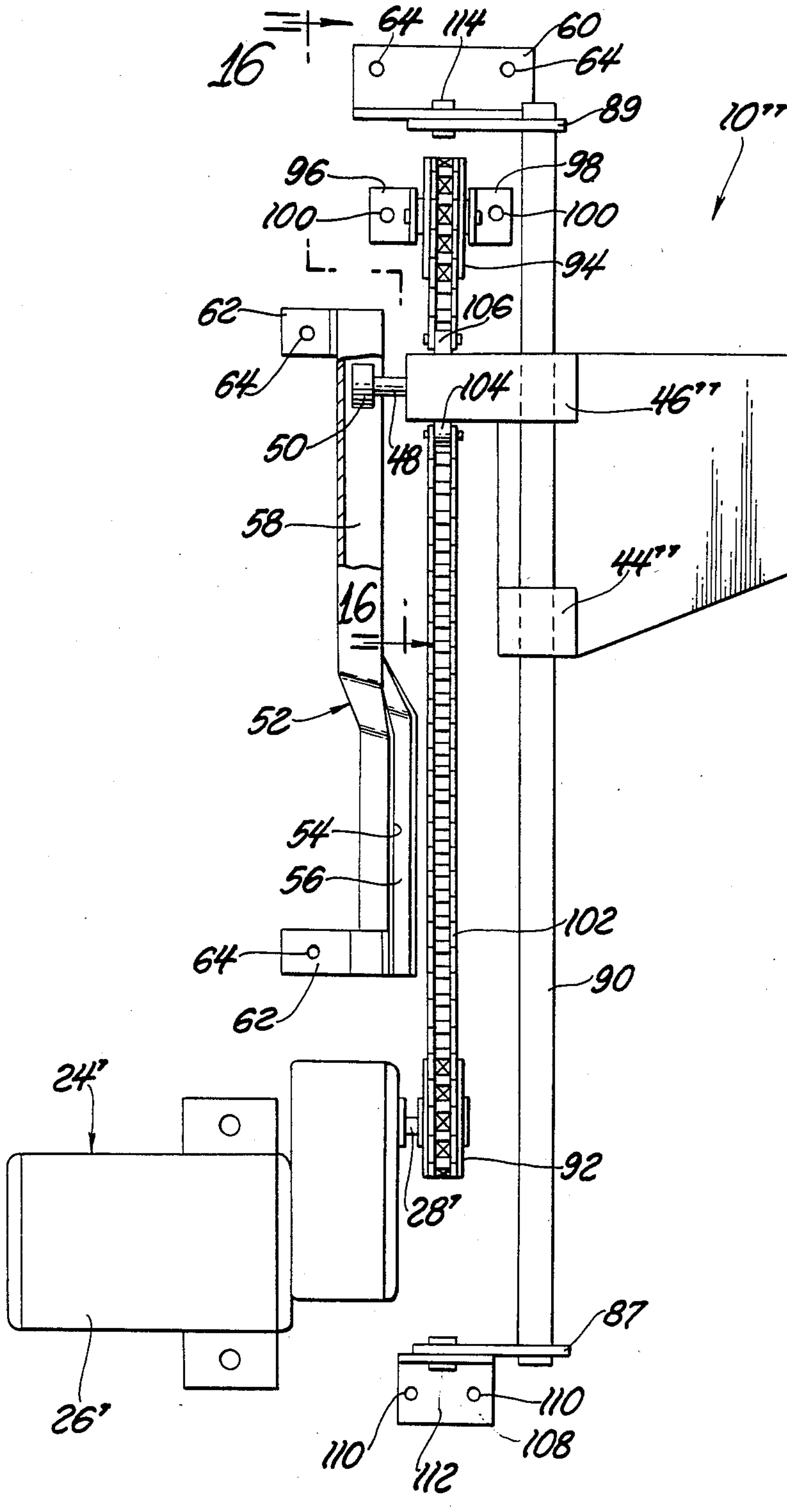
FIG. 15 is an elevational view partially broken away of a third embodiment of the instant invention.
Figure 16:
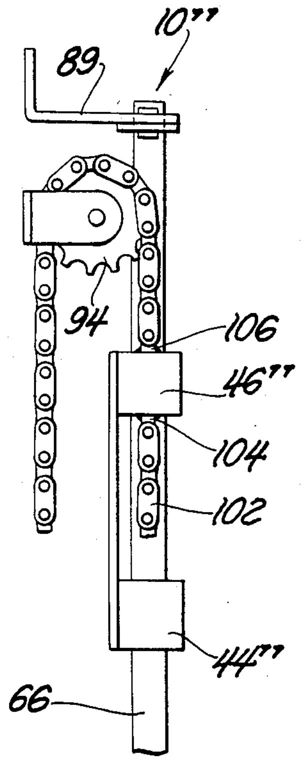
FIG. 16 is a fragmentary elevational view taken substantially along lines 16—16 of FIG. 15.

A third embodiment of the instant invention is generally shown at 10″ in FIGS. 15 and 16. The drive means 24′ includes a motor 26′ having a drive shaft 28′ extending therefrom. A drive pulley 92 is mounted for rotation upon the drive shaft 28′. A driven pulley 94 is mounted between support brackets 96 and 98, brackets 96 and 98 having openings 100 therethrough adapted for receiving fasteners for securing the brackets 96 and 98 to the inside wall of a door. Belt means comprising a chain 102 is entrained about the pulleys 92 and 94 and engaged by the teeth of the pulleys 92 and 94. The follower means of the third embodiment 10″ include follower members 44″ and 46″ fixedly secured to the arm member 66. The upper follower member 46″ is pivotally piloted between the opposite ends 104 and 106 of a master link in the chain so as to be raised and lowered when the chain is actuated by the drive means 24', while permitting pivotal movement of the upper follower member 46" relative to the master link between the ends 104 and 106 thereof to prevent twisting the chain 102 as the cam wheel 50 follows guide track 52. The follower members 44" and 46" are slidably mounted on the rod 90. The rod 90 is mounted between support brackets 87 and 89, support bracket 87 being pivotally mounted on bracket 108. Bracket 108 is fixedly secured to the inner wall of the door by fasteners adapted to be inserted through openings 110. Brackets 87 and 89 are mounted for pivotal movement relative to brackets 108 and 60 by pins 112 and 114 respectively. In operation, as the drive means 24' actuates the pulleys 92 and 94 and belt 102 to raise the arm member 66, the arm member 66, rod 90 and brackets 87 and 89 are pivoted about the pins 112 and 114.

Figure 6:
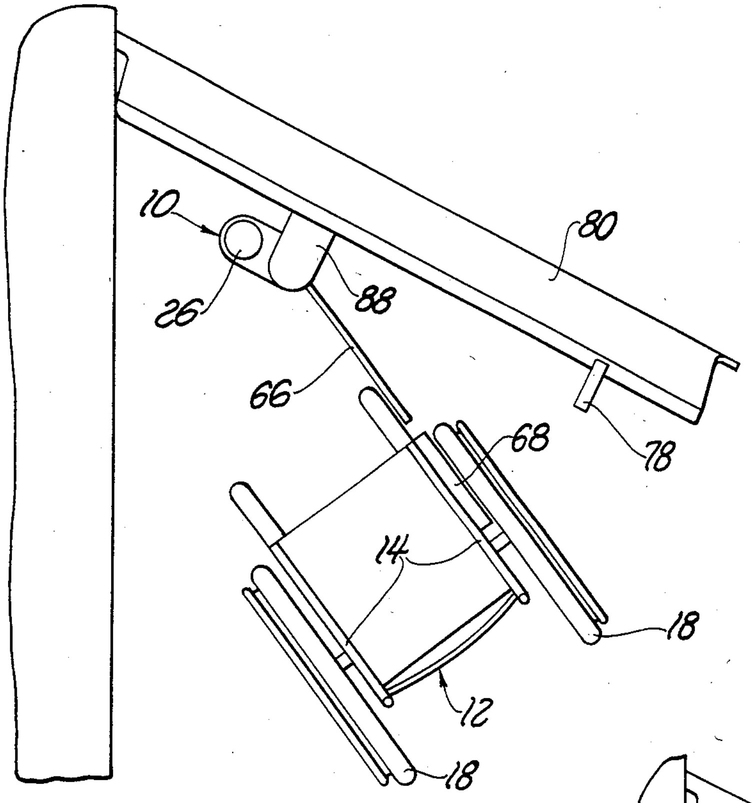
FIG. 6 is a top plan view of a wheelchair approaching the instant invention.
Figure 7:
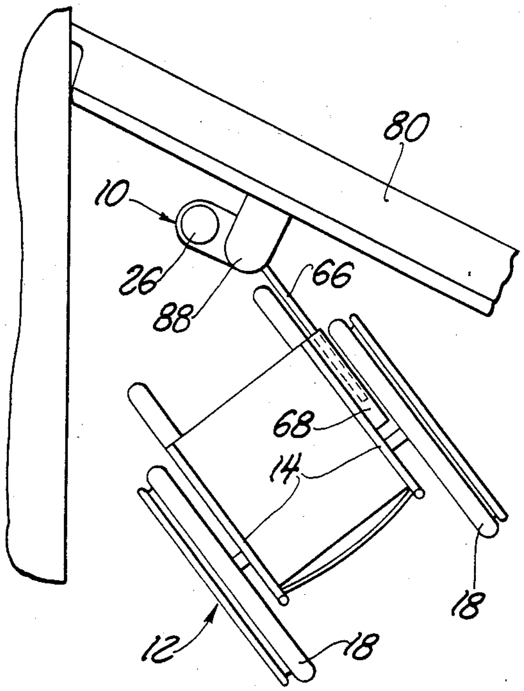
FIG. 7 is a top plan view of a wheelchair in the docked position relative to the instant invention.
Figure 8:
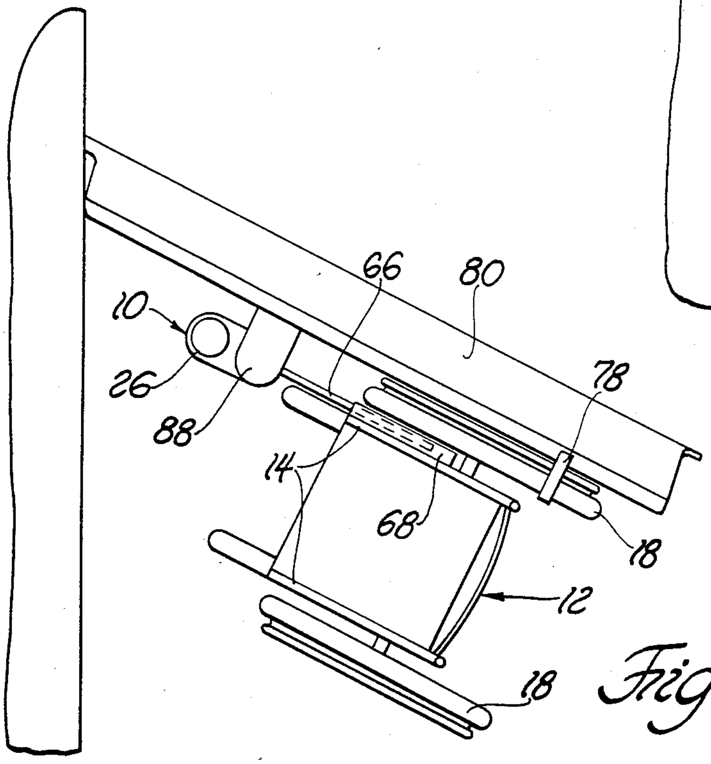
FIG. 8 is a top plan view of a wheelchair lifted by the instant invention.
Figure 9:
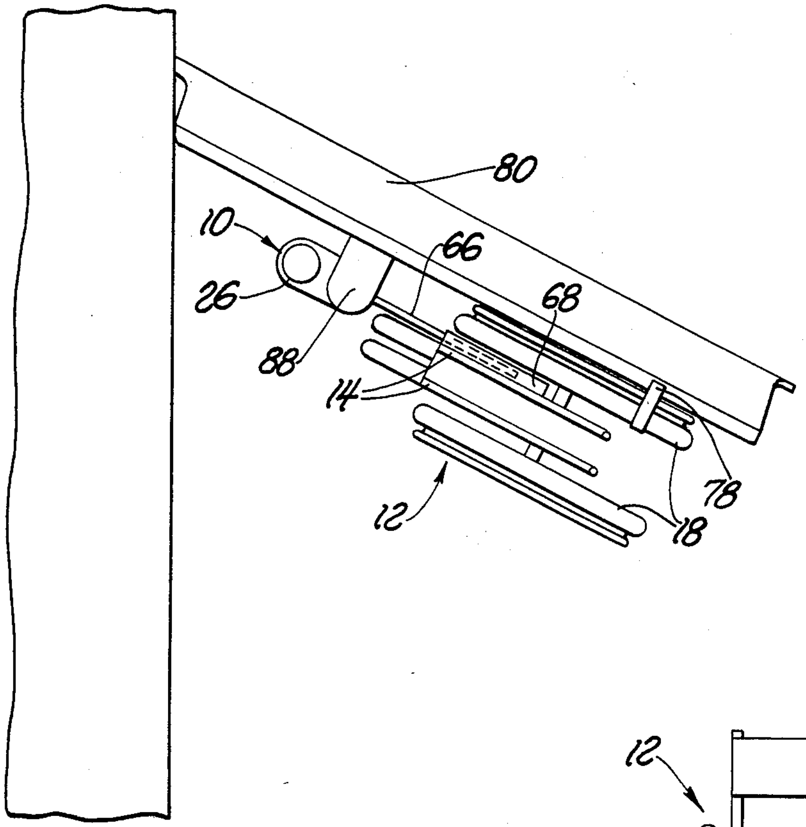
FIG. 9 is a top plan view of a wheelchair lifted and folded by the instant invention.
Figure 10:
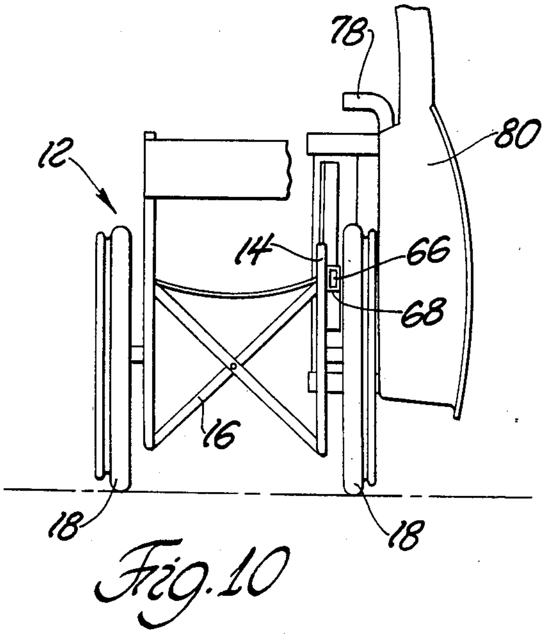
FIG. 10 is a rear elevational view of a wheelchair in the docked position relative to the instant invention.
Figure 11:
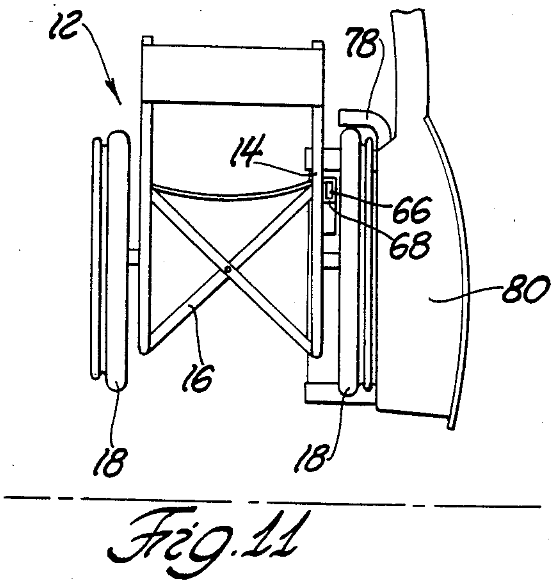
FIG. 11 is a rear elevational view of a wheelchair lifted by the instant invention.
Figure 12:
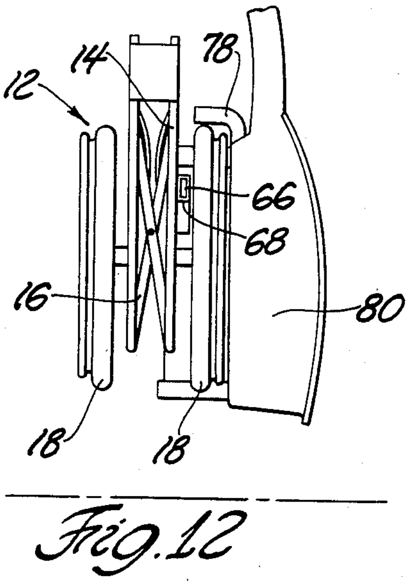
FIG. 12 is a rear elevational view of the wheelchair in the folded position relative to the instant invention.

The docking and folding operations of the instant invention are shown in FIGS. 6 through 12. As shown in FIG. 6, the door 80 of the vehicle is open and the arm member 66 is actuated to its lower position extending away from the door 80. The wheelchair 12 is wheeled to a position such that the arm member 66 is aligned with the envelope member 68. The arm member 66 may be inserted into the pocket 70 of the envelope member 68. The wheelchair 12 is then rolled to the docked position as shown in FIGS. 7 and 10, in which the arm member 66 is inserted into the pocket 70 of the envelope member 68 and locked in position. The arm member 66 is actuated to be raised by the drive means 24 as previously described, thereby raising the wheelchair 12 and bringing it to a position adjacent the door as shown in FIGS. 8 and 11. The wheelchair 12 is raised so that the wheel 18 closest to the door 80 abuts the wheel stop 78. The envelope member 68 is secured to the arm 14 of the wheelchair 12 independent of the wheel support assembly supporting the wheels 18 whereby as the arm member 66 and envelope member 68 are further raised, the wheelchair is folded about the scissor members 16 as shown in FIGS. 9 and 12. In other words, the envelope member 68 is connected to the arm 14 of the wheelchair 12 in such a way that the additional raising of the envelope member 68 and adjoining arm 14 raises the frame of the wheelchair 12 as the wheel 18 abuts against the stop member 78 so as to fold the wheelchair 12 against the door 80. By lowering the wheelchair 12, the weight of the wheelchair 12 unfolds the wheelchair 12 as it is lowered and moved away from the door member 80 by the assembly 10.

The instant invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than is specifically described.

The embodiments of the invention in which an exclusive property or privilege is claimed are defined as follows:

1. A wheelchair docking and storage assembly for collapsing and storing a wheelchair having a frame which folds as the frame is raised relative to the wheels thereof, said assembly comprising:

lifting means for engaging the frame of the unfolded wheelchair and operative to raise the wheelchair through a predetermined vertical distance; and stop means operative to engage a wheel of the rising, unfolded wheelchair as the wheelchair approaches the end of said predetermined distance so that continued rising movement of the wheelchair frame through the remainder of said vertical distance raises the wheelchair frame relative to the stopped wheel to collapse the wheelchair.

2. An assembly as set forth in claim 1 wherein said lifting means includes arm means for engaging the wheelchair, raising means for selectively and reversibly raising said arm means, and drive means operatively connected to said raising means for driving said raising means.

3. An assembly as set forth in claim 2 wherein said assembly is adapted to be mounted on a support wall and said raising means includes a screw member having an outer threaded surface operatively connected to said drive means to be selectively driven in a clockwise or counterclockwise direction, follower means fixedly connected to said arm means and threadedly connected to said screw member so as to travel along said screw member as it is driven by said drive means, and guide means for guiding said follower means to turn relative to said screw member and move said arm means against the support wall as said follower means is raised along said screw member and to move said arm means away from the support wall as said follower means is lowered along said screw member.

4. An assembly as set forth in claim 3 wherein said follower means includes at least one follower member having a threaded bore therethrough threadedly engaging said screw member, an axle member extending therefrom, and a cam wheel rotatably mounted on said axle member, said guide means being substantially U-shaped in cross-section defining an inner channel, said cam wheel being rotatably mounted within said channel for movement therealong.

5. An assembly as set forth in claim 4 wherein said channel includes a lower portion and an upper portion being twisted axially approximately 25 degrees counterclockwise relative to said lower portion and having a constant cross-sectional dimension whereby said arm means is pivoted approximately 25 degrees as said follower member travels from said lower portion of said channel to said upper portion of said channel.

6. An assembly as set forth in claim 5 including side load absorbing means for absorbing side loads placed upon said arm means.

7. An assembly as set forth in claim 6 including spaced support brackets mounted on said screw member, said side load absorbing means including a rod supported between said support brackets and being spaced and parallel relative to said screw member, said follower members slidingly engaging said rod member.

8. An assembly as set forth in claim 2 wherein said raising means includes at least two pulleys and belt means entrained over said pulleys, one of said pulleys being operatively connected to said drive means to be driven thereby, follower means fixedly connected to said arm means so as to be raised and lowered as said belt means is actuated by said drive means, and guide means for guiding said follower means to turn relative to said belt means and pivot said arm means relative to a support wall as said arm means is raised and lowered.

9. An assembly as set forth in claim 8 wherein said follower means includes at least one follower member engaging said belt means, an axle member extending therefrom, and a cam wheel rotatably mounted on said axle member, said guide means being substantially U-shaped in cross-section defining an inner channel, said cam wheel being rotatably mounted within said channel for movement therealong.

10. An assembly as set forth in claim 9 wherein said channel includes a lower portion and an upper portion being twisted axially approximately 25 degrees counter-clockwise relative to said lower portion and having a constant cross-sectional dimension whereby said arm means is pivoted approximately 25 degrees as said follower member travels from said lower portion of said channel to said upper portion of said channel.

11. A wheelchair docking and storage assembly for collapsing and storing a wheelchair having a frame which folds as the frame is raised relative to the wheels thereof, said assembly comprising:

lifting means for engaging the frame of the wheelchair and lifting the wheelchair;

stop means for engaging a wheel of the wheelchair whereby said lifting means raises the wheelchair relative to the wheel thereof which engages said stop means to collapse the wheelchair;

said lifting means including arm means for engaging the wheelchair, raising means for selectively and reversibly raising said arm means, and drive means operatively connected to said raising means for driving said raising means;

said assembly being adapted to be mounted on a support wall;

said raising means including a screw member having an outer threaded surface operatively connected to said drive means to be selectively driven in a clockwise or counter clockwise direction, follower means fixedly connected to said arm means and threadably connected to said screw member so as to travel along said screw member as it is driven by said drive means, and guide means for guiding said follower means to turn relative to said screw member and move said arm means against the support wall as said follower means is raised along said screw member and to move said arm means away from the support wall as said follower means is lowered along said screw member;

said follower means including at least one follower member having a threaded bore therethrough threadably engaging said screw member, an axle member extending therefrom, and a cam wheel rotatably mounted on said axle member;

said guide means being substantially U shaped in cross section defining an inner channel;

said cam wheel being rotatably mounted within said channel for movement there along;

said channel including a lower portion and an upper portion being twisted axially approximately 25 degrees counter clockwise relative to said lower portion and having a constant cross sectional dimension whereby said arm means is pivoted approximately 25 degrees as said follower member travels from said lower portion of said channel through said upper portion of said channel;

said arm means including an envelope member adapted to be connected to an arm of the wheelchair and having a pocket therein; and said arm means further including a plate member connected to said follower member and having a predetermined shape for being inserted into said pocket.

12. An assembly as set forth in claim 11 including locking means for locking said plate member within said pocket.

13. An assembly as set forth in claim 12 wherein said plate member includes a hole extending therethrough, said locking means including a plunger member mounted on said envelope member and a spring for inwardly biasing said plunger member into said pocket for inserting said plunger member into said hole in said plate member.

14. An assembly as set forth in claim 13 wherein said plunger member includes a tapered end portion for engaging said hole in said plate member.

15. An assembly as set forth in claim 14 wherein said stop means includes an L-shaped bracket having a first end adapted to be secured to the support wall and a second end having a lower surface for engaging the raised wheel of the wheelchair as said lifting means continues to raise the frame of the wheelchair.

16. An assembly as set forth in claim 15 including mounting means for mounting said assembly on the support wall.

17. An assembly as set forth in claim 16 wherein said mounting means includes mounting plates connected to said drive means, said screw member, and said guide means, said mounting plates being adapted to be connected to the support wall.

18. An assembly as set forth in claim 17 including housing means for enclosing said lifting means.

19. An assembly as set forth in claim 18 wherein said housing means includes a cylindrical member disposed about said screw member and said guide means having a vertical slot extending therethrough along the length thereof, said plate member extending through said slot, said housing means further including a pair of spaced support brackets for supporting said cylindrical member therebetween.

20. An assembly as set forth in claim 19 wherein said cylindrical member is rotatably mounted between said support brackets allowing rotation of said cylindrical member as said plate member pivots about said screw member.

* * * * *